United States Patent [19]
Denton et al.

[11] Patent Number: 5,269,662
[45] Date of Patent: Dec. 14, 1993

[54] AIRCRAFT AIR CONDITIONER COMPRESSOR DRIVE AND MOUNTING APPARATUS

[76] Inventors: John W. Denton; Jack A. Denton, both of P.O. Box 12295, Jackson, Miss. 39236

[21] Appl. No.: 913,588

[22] Filed: Jul. 14, 1992

[51] Int. Cl.⁵ .......................... F04B 9/02; F04B 17/00
[52] U.S. Cl. ..................... 417/319; 417/321; 417/362
[58] Field of Search .......... 417/362, 319, 321

[56] References Cited

U.S. PATENT DOCUMENTS

| | | | |
|---|---|---|---|
| 1,665,765 | 4/1928 | Barton | 417/319 |
| 2,767,558 | 10/1956 | Murray | 417/319 |
| 4,741,676 | 5/1988 | Janes | 417/362 |

FOREIGN PATENT DOCUMENTS 1122376 1/1962 Netherlands ............ 417/362

Primary Examiner—Richard A. Bertsch
Assistant Examiner—Roland G. McAndrews, Jr.
Attorney, Agent, or Firm—Phelps Dunbar

[57] ABSTRACT

An aircraft air conditioner refrigerant compressor drive and mounting apparatus for use on aircraft of the type having free rotating power output gears in the accessory pads. The accessory pads accept the mounting of the compressor drive and mounting apparatus to which is mounted an air conditioner refrigerant compressor. The engine power output gear couples with the drive shaft within the compressor drive and mounting apparatus. The drive shaft extends linearly through the compressor drive and mounting apparatus, and is supported by bearings within. Bracket means are provided for mounting an air conditioner refrigerant compressor to the compressor drive and mounting apparatus such that the refrigerant compressor drive shaft is generally parallel with the compressor drive and mounting apparatus drive shaft. A pulley is attached to the refrigerant compressor drive shaft and generally aligned with a pulley on the compressor drive and mounting apparatus drive shaft. Belt drive means are provided for connecting the compressor drive and mounting apparatus drive shaft pulley with the refrigerant compressor drive shaft pulley to drive the refrigerant compressor.

11 Claims, 4 Drawing Sheets

AIRCRAFT AIR CONDITIONER COMPRESSOR DRIVE AND MOUNTING APPARATUS

FIELD OF THE INVENTION

The present invention relates to an apparatus for mounting and driving an air conditioner compressor from an aircraft engine.

DESCRIPTION OF THE BACKGROUND ART

The difficulty of incorporating air conditioning components in modern-day aircraft driven by turbine engines is compounded by several factors. Aircraft are particularly difficult to provide with air conditioning systems because of the crowded and cramped space within the aircraft, which leaves little space for necessary components of the air conditioning system. The strength and weight of the structural materials used in the air conditioning components and in the aircraft itself are of critical importance. In providing an auxiliary component for a pre-designed aircraft, particular care must be taken so as not to adversely affect the structure or operation of the aircraft. An example of an air conditioning system which may adversely affect the operation of the aircraft is found in an electrical system powered by a 24 volt DC motor. The DC motor drives a compressor and a fan for the condenser. This electrical air conditioner system is heavy in weight and places a large amperage drain on the electrical system of the aircraft. The electrical air conditioner system causes electrical overload when the aircraft is in night flight and may cause electrical overload during daytime flight. Another example of an air conditioning system which may adversely affect the operation of the aircraft is found in an electrical air conditioner system which uses an inverter to convert 24 vdc to 110 vac. The 110 vac air conditioner system works the same way as a residential split air conditioner. The 110 vac air conditioner system is even heavier than the 24 vdc system described above and is difficult to service because of its many electrical components.

Another obstacle to be overcome concerns the weight and strength of the mounting apparatus. Because of the critical weight and strength factors, it is difficult to find sufficient support for the drive system without adversely affecting the supporting structure. Additionally, rotation of the compressor and drive system may set up adverse dynamic or vibrational characteristics in the vibration environment of the engine drive. Use of the aircraft engine to drive the compressor may result in an adverse power drain on the engine with potentially dangerous consequences. Similarly, malfunction of the compressor or compressor drive system may damage or incapacitate the engine.

Because of the above-described difficulties and others, few attempts at providing workable refrigerant air conditioning systems for small aircraft have been successful. Beech Aerospace has several different mounting apparatus models that may be used with several small aircraft engines. These brackets still present difficulties based upon their size and complexity. As a result of their size, applications to agricultural-use aircraft are very limited. Additionally, these brackets are prone to cracking, apparently due to the design of the structure supporting the bracket and the inadequate strength of the material of construction.

There thus remains a need for a lightweight, compact aircraft air conditioner compressor drive and mounting apparatus which does not adversely affect the support structure of the aircraft, does not introduce adverse vibrational characteristics, does not result in excessive power drain from the engine, and does not introduce excessive risk of damage or incapacitation of the engine due to malfunction of the apparatus.

SUMMARY OF THE INVENTION

An air conditioner compressor drive and mounting apparatus for use on aircraft of the type having free rotating power output gears in the accessory pads is disclosed herein. The compressor drive and mounting apparatus is mounted to an accessory pad of the aircraft engine such that the drive shaft of the apparatus couples with an aircraft engine power output gear. Rotation of the aircraft engine power output gear causes rotation of the drive shaft of the compressor drive and mounting apparatus. The drive shaft of the apparatus is connected to a pulley which interacts with a pulley of an air conditioner compressor through belt drive means. The air conditioner compressor is mounted to the compressor drive and mounting apparatus in such a manner as to maintain a parallel relationship between the drive shaft of each device. Means are also provided to limit the stress placed upon the aircraft engine accessory pad by the compressor and compressor drive and mounting apparatus.

DESCRIPTION OF THE PREFERRED EMBODIMENT

The present invention is suitable for use in any aircraft having an engine with free rotating power output gears in the accessory pads, such as the Pratt & Whitney PT6 series. A power output shaft is driven by engine internal gearing as the engine operates.

Figure 1:
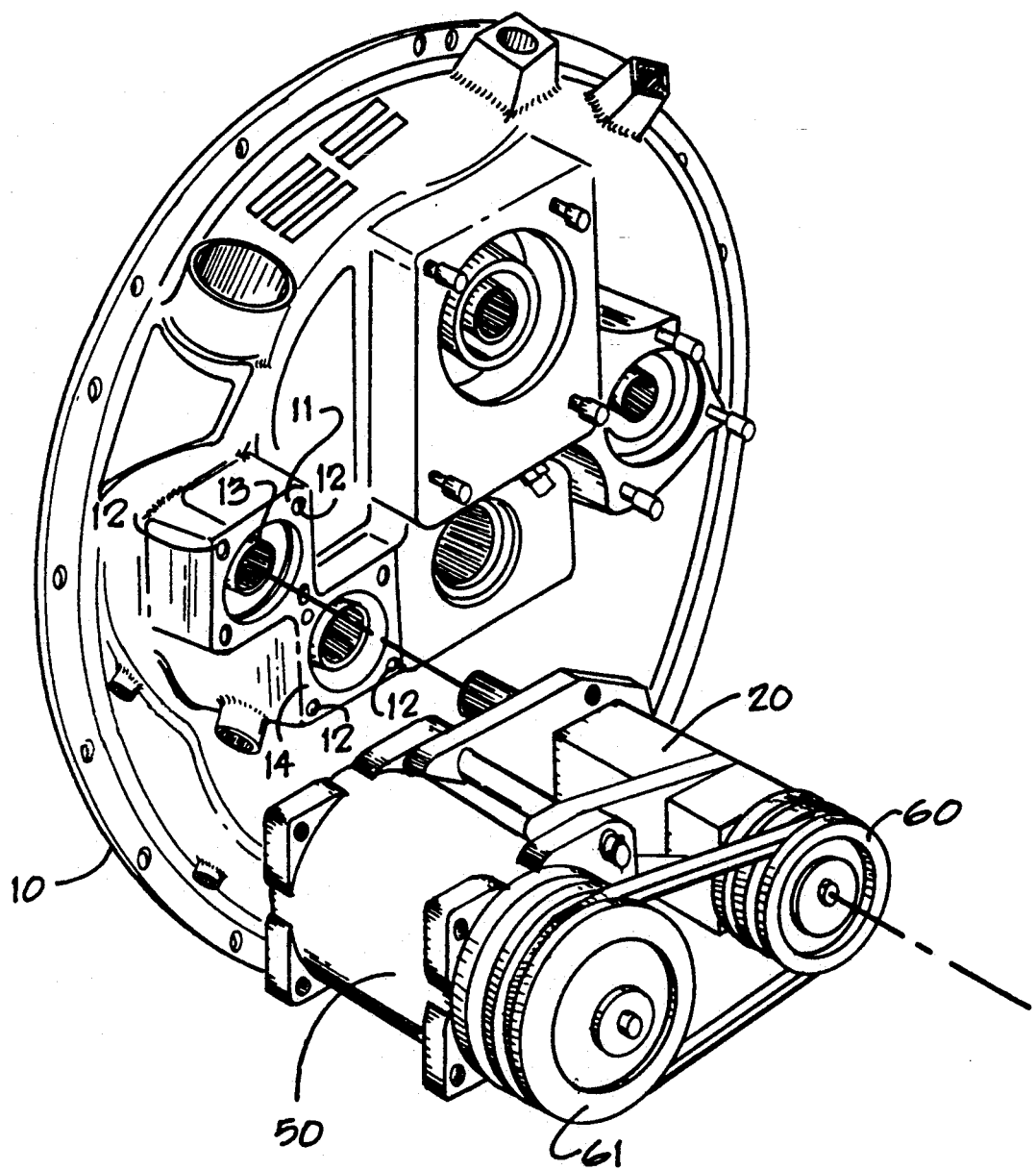
FIG. 1 is a perspective view of an aircraft air conditioner compressor drive and mounting apparatus with compressor and an aircraft engine accessory pad for connection with and driving of said apparatus.

Shown in FIG. 1 is the accessory pad area of a Pratt & Whitney PT6 Turbine Engine 10. The accessory pad 11 is the power take-off pad of the Pratt & Whitney PT6 Turbine Engine 10. The engine power output gear 13 rotates counter clockwise within power take-off pad 11.

Figure 2:
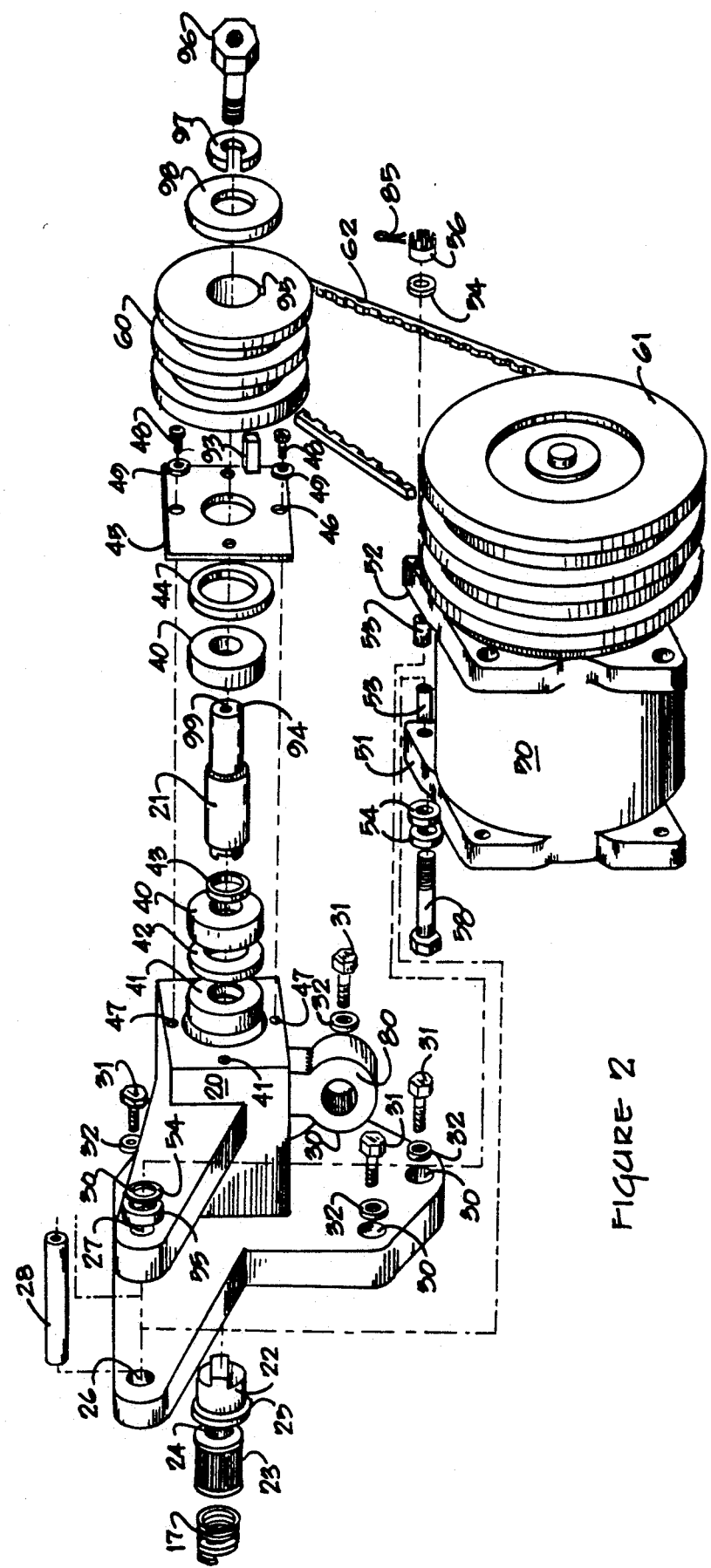
FIG. 2 is an exploded view of portions of the apparatus.

As best illustrated in FIG. 2, a compressor drive and mounting apparatus in accordance with the present invention has a drive shaft 21 to which is connected a spline shaft 22. Teethed-end 23 of the spline shaft 22 corresponds to the mating indentation in the engine power output gear 13 of the power take-off pad 11. (See FIG. 1). The shear point 24 provides means for disconnecting the engine power output gear 13 from the spline shaft 22 should rotation of the drive shaft 21 be excessively restricted or stopped. A spring 17 (See FIG. 2) is inserted into the barrel of power take-off gear 13. Should the shear point 24 of the spline shaft 22 shear, the flange 25 will retain the spline shaft 22 in place. The spring 17 keeps the teethed-end 23 in place by urging the teethed-end 23 toward the spline shaft 22 and away from the back of the engine power output gear 13. The spring 17 thus prevents the teethed-end 23 from moving freely inside the power output gear 13 should the shear point 24 of the spline shaft 22 shear.

The compressor drive and mounting apparatus housing 20 is connected to the engine power take-off pads 11 and 14 (See FIG. 1) by any suitable means, such as with openings 30 corresponding to threaded bolt holes 12 from the engine power take-off pads 11 and 14. Bolts 31 (See FIG. 2) extending through said openings 30 securely fasten the compressor drive and mounting apparatus housing 20 to the engine power take-off pads 11 and 14. The teethed-end 23 of the spline shaft 22 is thereby also held in place in the corresponding mating indentations on the engine power output gear 13 of the power take-off pad 11. Washers 32 may be placed on the bolts 31 thereby preventing direct contact between the bolts 31 and the compressor drive and mounting apparatus housing 20.

As shown in FIG. 2, the compressor drive and mounting apparatus drive shaft 21 is supported within the compressor drive and mounting apparatus housing 20 by bearing members 40 located at opposite ends of the drive shaft 21. A seal 41 prevents any foreign matter from transporting between the engine 10 and the compressor drive and mounting apparatus housing 20. The spacer 42 provides for proper spacing within the compressor drive and mounting apparatus housing 20. The wave springs 43 and 44 place a load of up to 46 newtons on the bearings 40.

Oil may leak from the aircraft engine through the seal (not shown) in the engine power output gear 13. Up to 3 cc's of engine oil per hour may leak. If this engine oil gets past the seal 41 it may wash the grease out of the bearings 40. To prevent this, a weeper hole or drain (not shown) is drilled through the compressor drive and mounting apparatus 20 at a point just in front of the seal 41. This allows the engine oil that leaks past the seal in the engine power output gear 13 to drain out of the compressor drive and mounting apparatus 20 before reaching the seal 41. If desired, this oil may be drained out of the engine compartment by any suitable means such as by using fittings and a drain hose or aluminum tubing to connect the weeper hole to the skin of the engine compartment.

The seal 41, spacer 42, bearings 40, wave springs 43 and 44 are maintained in place within the compressor drive and mounting apparatus housing 20 by a keeper plate 45. The keeper plate 45 is connected to the compressor drive and mounting apparatus housing 20 by any suitable means, such as with drilled holes 46 in the keeper plate 45 corresponding to threaded bolt holes 47 in the compressor drive and mounting apparatus housing 20. Bolts 48 extend through said drilled holes 46 in the keeper plate 45, and securely fasten the keeper plate 45 to the compressor drive and mounting apparatus housing 20. Washers 49 may be placed on the bolts 48 thereby preventing direct contact between the bolts 48 and the keeper plate 45.

The compressor drive and mounting apparatus drive shaft pulley 60 is prevented from slipping on the drive shaft 21 by placing a keystock 93 in the keyway opening 94 on the drive shaft 21. The drive shaft pulley 60 is then placed on the drive shaft 21 so as to align the opening 95 in the drive shaft pulley 60 with the keystock 93.

The drive shaft pulley 60 is safety kept on the drive shaft 21 by the keeper bolt 96 which is passed through a lock washer 97 and flat washer 98 and into the threaded bolt hole 99 in the end of the drive shaft 21.

The compressor drive and mounting apparatus housing 20 has mounting openings 26 and 27 (see FIG. 2). A bushing 28 is inserted into the mounting openings 26 and 27. The compressor 50 has mounting openings 51 and 52. In the mounting openings 51 and 52 bushings 53 are inserted. The compressor 50 is mounted to the compressor drive and mounting apparatus housing 20 at mounts 26 and 27. Mounting is achieved by any suitable means, such as by passing a bolt 53 through optional washers 54 to compressor mounting opening 51, through compressor drive and mounting apparatus housing mounts 26 and 27, to optional spacer 55 to optional washer 54 to compressor mounting opening 52 to optional washer 54 to nut 56. A cotter pin 85 may be used to safely secure nut 56.

As best shown by FIG. 1, the compressor 50 is mounted to the compressor drive and mounting apparatus housing 20 so as to bring the compressor drive shaft, which extends linearly within the compressor 50, into generally parallel alignment with the compressor drive and mounting apparatus drive shaft 21. The compressor drive and mounting apparatus drive shaft pulley 60 is adjusted so as to bring it into general alignment with the compressor pulley 61. The compressor 50 is preferably a high-efficiency piston rotary refrigerant compressor, such as the Sanden Model 508.

The optional off load mount 70 (See FIGS. 3, 4 and 5) and the belt tension rod 71 are mounted to the compressor 50 at opening 72. Mounting is accomplished by any suitable means such as by passing a bolt 73 through optional washers 74, through the belt tension rod 71, through optional off load mount 70 and compressor mount opening 72 to optional washer 74 to nut 75. Cotter pin 85 may be used to secure nut 75. The off load mount 70 may also be designed to come off the top of the compressor 50 rather than the bottom as shown. Certain aircraft engines, such as the Pratt & Whitney PT6-20, may not accommodate the off load mount 70 if mounted to the bottom of the compressor 50. However, many engines, including all Pratt & Whitney engines, will accommodate an off load mount 70 if mounted to the top of the compressor 50. Mounting from the top of the compressor 50 results in the off load mount 70 usually being in tension rather than in compression as when mounted from the bottom of the compressor 50.

Figure 3:
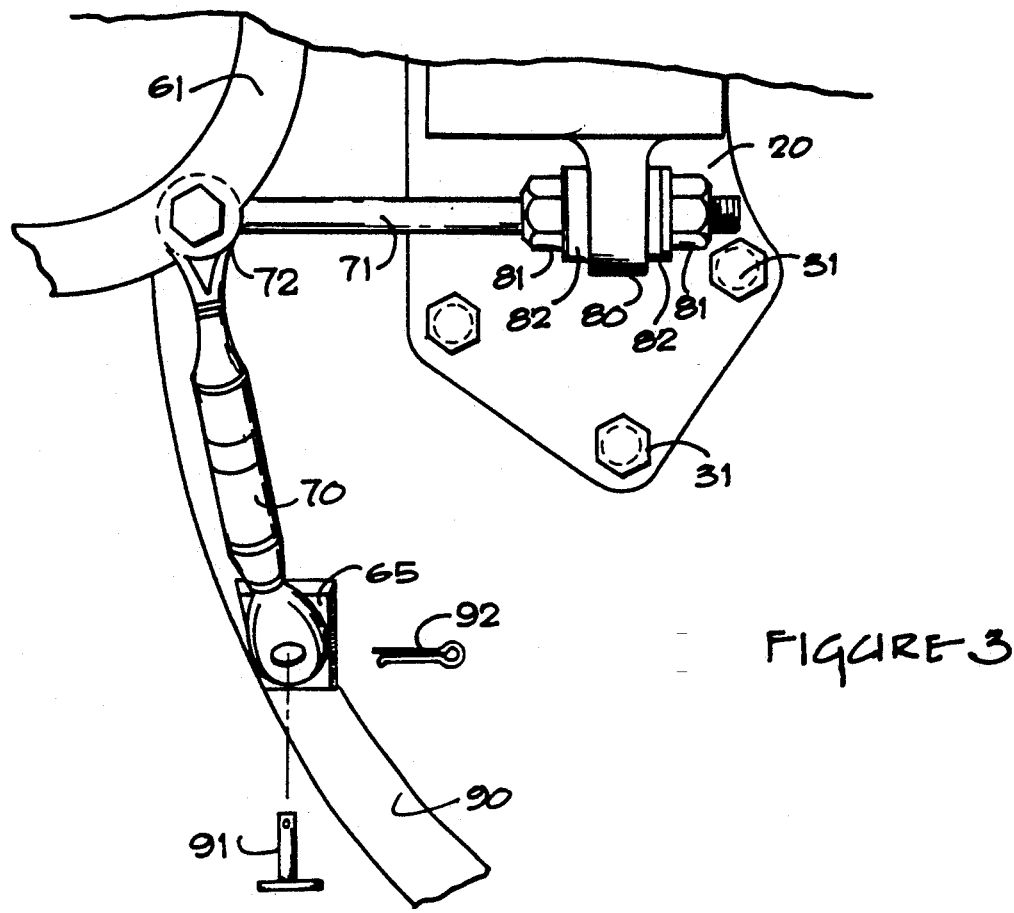
FIG. 3 is a view of the optional off load mount and belt tension rod.
Figure 4:
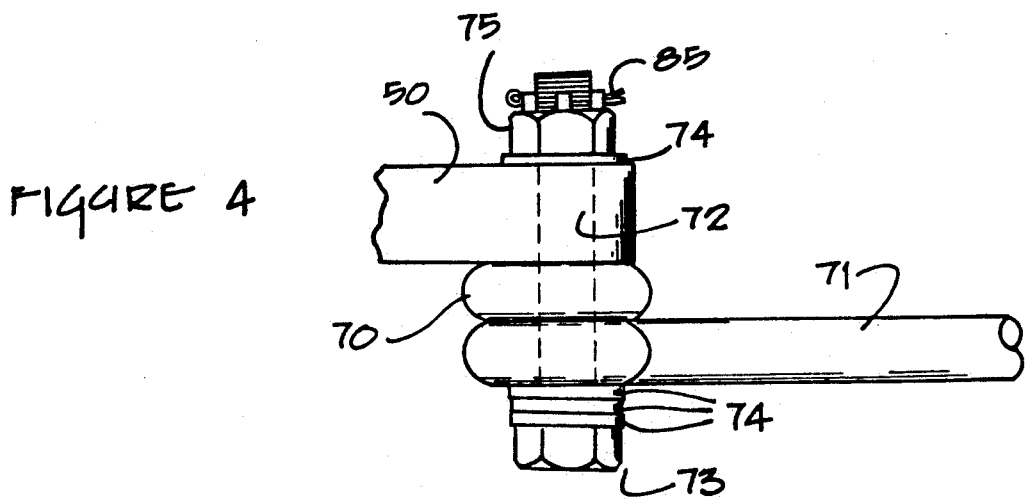
FIG. 4 is a view of the connection between the compressor and the optional off load mount and the belt tension rod.

The threaded end of the belt tension rod 71 is attached to the compressor drive and mounting apparatus housing 20 at mount opening 80 (See FIGS. 2 and 3). This is achieved by passing belt tension rod 71 through nut 81 to washer 82, through compressor drive and mounting apparatus housing mount opening 80 to washer 82 to nut 81. If it is desired to use the optional off load mount 70, then after mounting the off load mount 70 to compressor mount opening 72 as described above, it is necessary to mount the accessory case mount 90 to the flange of the accessory case (not shown) of engine 10 by any suitable means. As shown in FIG. 3, the end of the off load mount 70 not mounted to compressor 50 is then connected to the accessory case mount 90 by any suitable means such as by passing a clevis pin 91 through the off load mount 70, through a hole in the fin 65 affixed to the accessory case mount 90 and then putting a cotter pin 92 through the hole in clevis pin 91.

The compressor 50 is driven by one or more endless belts 62 (See FIG. 2) connecting the compressor pulley 61 to the compressor drive and mounting apparatus drive shaft pulley 60. The belts are advantageously constructed of materials which are capable of withstanding the high operating temperatures and speeds associated with an aircraft engine compartment. The pulleys 60 and 61 may be of any suitable size, but preferably combine to provide for a compressor speed of about 35% the rotational speed of the engine power output gear 13. With the Pratt and Whitney Model PT-6 series engine, the engine power output gear rotates at about 7600 RPM at full power. It is particularly preferred that the compressor drive system deliver about 5.3 h.p. to the compressor. With the Pratt and Whitney Model PT-6 series engine, this is accomplished by utilizing a pulley system which provides for a compressor speed of about 2674 RPM at full power. A compressor drive and mounting apparatus drive shaft pulley 60 of 1.75 inches in diameter (measured from the inside of the belt groove) in conjunction with a compressor pulley 61 of 5.0 inches in diameter (measured from the inside of the belt groove) is suitable. A cooling capacity of about 17,000 BTU/hr. is provided when 5.3 h.p. is delivered to the Sanden Model 508 compressor. Optional evaporators and condenser units can be added to increase BTU/hr. output without increasing h.p. to the Sanden Model 508.

In a particularly preferred embodiment of the invention the tension of the belts 62 is made adjustable by utilization of the adjustable belt tension rod 71. The tension of the belts 62 may be adjusted when nuts 81 are loosened, by moving the compressor pulley 61 away from or toward the drive shaft pulley 60. When the desired tension of 8 to 10 lbs. is reached nuts 81 are tightened. The tension of belts 62 is adjusted to deliver adequate power to the compressor 50. However, the belts 62 are designed to break when more than 450 in.lbs. of torque are being delivered to the compressor 50. As an additional safety measure, it is preferred that the spline shaft 22 (See FIG. 2) will shear at point 24 when approximately 500 in.lbs. of torque or more is being drawn from the engine 10 by the compressor 50 or drive system.

Figure 5:
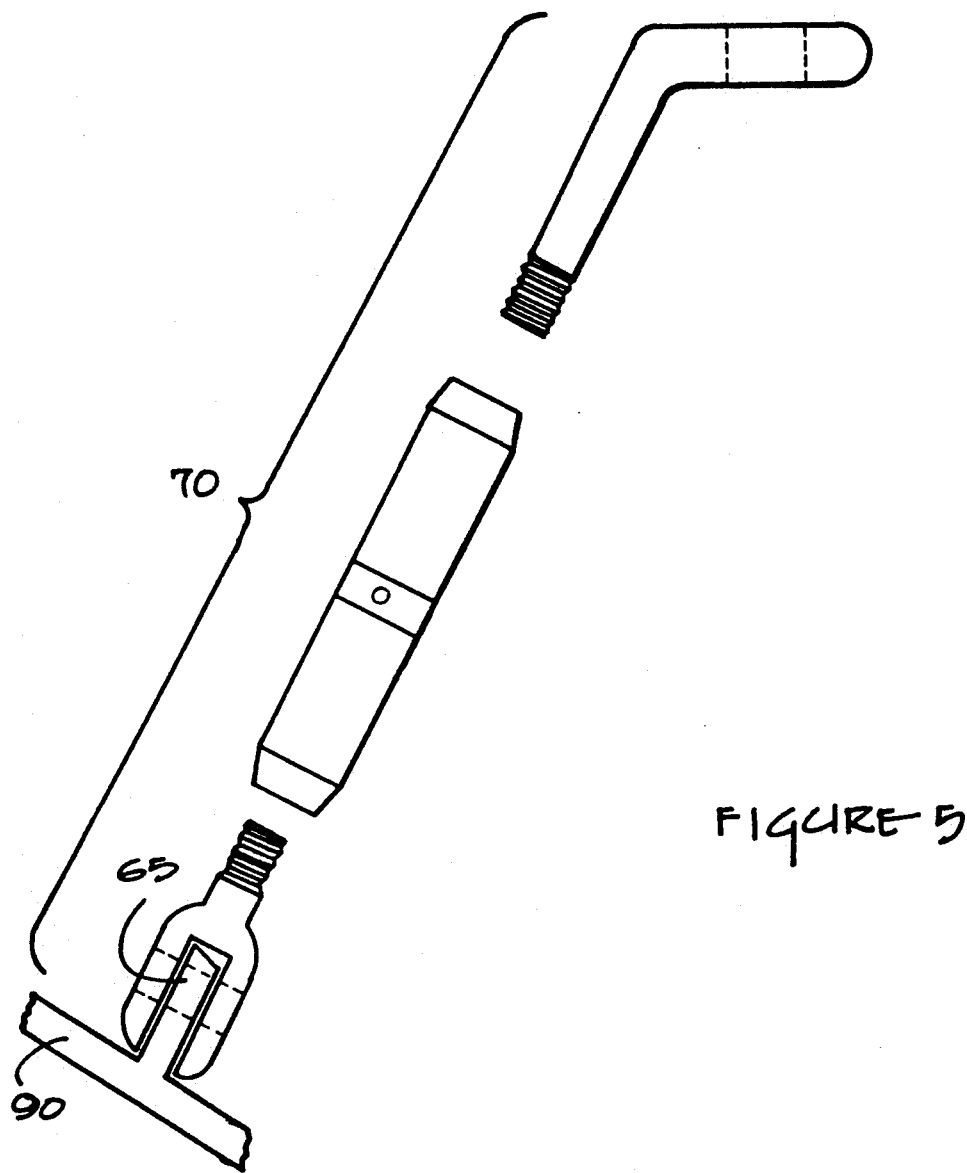
FIG. 5 is an exploded view of the optional off load mount.

In order to minimize stress on the power take-off pads 11 and 14, it is preferred that the compressor 50 and the compressor drive and mounting apparatus have a combined overhang bending moment at engine pads 11 and 14 of not over 25 inch pounds. The optional off load mount 70 may be used to reduce the overhang bending moment if necessary, through shortening or lengthening the off load mount 70. As shown in FIG. 5, the length of the off load mount 70 may be adjusted by rotating its center portion, thereby changing the extent to which the compressor apparatus is supported.

The air conditioning refrigerant compressor 50 is connected to typical refrigerant evaporator and condenser units, with air duct systems, fans and controls as is well known in the art. In particularly preferred embodiments, the refrigerant compressor 50 is connected to a refrigerant condenser unit. The condenser unit is mounted in the fuselage of the plane with a vent in a side panel to allow fans mounted on the condenser to move air across the condenser and out the plane. The compressor and condenser are further connected with preferably one or more refrigerant evaporator(s) mounted under the pilot's seat. Alternatively, the evaporator(s) may be located behind the pilot's seat, or situated under the dash board, similar to an automobile air conditioner evaporator. Such locations of the condenser and evaporator(s) do not adversely affect the balance of the aircraft.

The aircraft air conditioning compressor drive and mounting apparatus of the present invention does not adversely affect the support structure of the aircraft, and provides for rotational frequencies which do not introduce adverse vibrational characteristics. The belt drive system does not drain excessive power from the engine, and the shear point system along with the provision for belt breakage provides for safe disconnection of the apparatus from the engine power take-off gear in the event of malfunction. The preferred material of construction is aluminum. The compressor drive and mounting apparatus may be constructed of other materials, but other materials are generally not preferred due to increased weight and the risk of the materials having a galvanic reaction with other aircraft components.

It will be recognized by those skilled in the art that modifications may be made to the illustrated and described apparatus which will be within the scope of the invention. It is to be understood that the invention is not to be limited by the illustrations and description, but only by the scope of the claims.

What is claimed is:

1. An air conditioner refrigerant compressor drive and mounting apparatus for fixed-wing airplanes of the type having an engine power output gear and accessory pad, comprising:

a compressor drive and mounting apparatus housing;

attaching means for attaching said compressor drive and mounting apparatus housing to the accessory pad;

a compressor drive and mounting apparatus drive shaft extending linearly through said compressor drive and mounting apparatus housing;

a spline shaft for connecting said compressor drive and mounting apparatus drive shaft to the engine power output gear such that rotation of said compressor drive and mounting apparatus drive shaft occurs upon rotation of the engine power output gear, said spline shaft containing a splined-end which corresponds to the mating indentations on the engine power output gear and further containing a shear point consisting of an area of lesser relative shaft diameter, whereby said shear point fractures under a predetermined level of applied torque, thereby disconnecting the engine power output gear from said compressor drive and mounting apparatus drive shaft in the event the predetermined level of applied torque is exceeded;

bearing members located at opposite ends of said compressor drive and mounting apparatus drive shaft whereby said compressor drive and mounting apparatus drive shaft may freely rotate within said compressor drive and mounting apparatus housing;

a keeper plate removably connected to said compressor drive and mounting apparatus housing, whereby said bearing members are maintained in place within said compressor drive and mounting apparatus housing via said plate;

a compressor drive and mounting apparatus drive shaft pulley attached to the end of said compressor drive and mounting apparatus drive shaft not connected to said spline shaft;

a keystock fitting into corresponding keyway openings on said compressor drive and mounting apparatus drive shaft pulley and said compressor drive and mounting apparatus drive shaft, whereby said compressor drive and mounting apparatus drive shaft pulley is prevented from slipping on said compressor drive and mounting apparatus drive shaft;

means for pivotally mounting an air conditioner refrigerant compressor to said compressor drive and mounting apparatus housing such that the compressor drive shaft for driving the compressor is generally parallel with said compressor drive and mounting apparatus drive shaft;

a compressor pulley attached to the compressor drive shaft and generally aligned with said compressor drive and mounting apparatus drive shaft pulley; and belt drive means connecting said compressor drive and mounting apparatus drive shaft pulley with said compressor pulley.

2. The invention described in claim 1, further comprising adjustment means for adjusting the tension of said belt drive means, comprising a belt tension rod with adjustable attachment, the rod having one end mounted to the compressor and the other end adjustably attached to said compressor drive and mounting apparatus housing, whereby the tension of said belt drive means can be adjusted by loosening said adjustable attachment of said belt tension rod and pivoting the compressor about said pivotally mounting means, followed by tightening said adjustable attachment of said belt tension rod.

3. The invention described in claim 1 wherein the diameter of said compressor drive and mounting apparatus drive shaft pulley and the diameter of said compressor drive shaft pulley are dimensioned whereby the compressor drive shaft rotates at a different rotational frequency than the rotational frequency of the aircraft engine.

4. The invention described in claim 1 wherein the diameter of said compressor drive and mounting apparatus drive shaft pulley is approximately 1.75 inches and the diameter of said compressor drive shaft pulley is approximately 5.0 inches, whereby the compressor drive shaft rotates at a speed of about 35% of the rotational speed of the engine power output gear.

5. The invention described in claim 1 wherein the diameter of said compressor drive and mounting apparatus drive shaft pulley is approximately 35% of the diameter of said compressor drive shaft pulley, whereby the compressor drive shaft rotates at a speed of about 35% of the rotational speed of the engine power output gear.

6. The invention described in claim 1, further comprising a spring, located in a barrel of the engine power output gear, whereby said splined-end of said spline shaft is urged away from the back of the engine power output gear and toward said compressor drive and mounting apparatus housing, preventing said splined-end of said spline shaft from moving freely inside the engine power output gear should said shear point of said spline shaft shear.

7. The invention described in claim 1 further comprising an adjustable off-load mount connecting the compressor and the casing of the airplane engine, said off-load mount being a rigid rod of adjustable length, in compression when placed below the compressor, and in tension when placed above the compressor, whereby the overhang bending moment at the accessory pad of the airplane engine resulting from the weight of the compressor and said compressor drive and mounting apparatus is reduced.

8. The invention described in claim 1 further comprising a flange located on said spline shaft opposite said splined-end of said spline shaft, and adjacent to said shear point of said spline shaft, whereby said spline shaft is prevented from exiting said compressor drive and mounting apparatus housing.

9. The invention described in claim 1, further comprising a seal encircling said compressor drive and mounting apparatus drive shaft, located at the end of said compressor drive and mounting apparatus drive shaft closest to the aircraft engine, and adjacent to said bearing means, whereby foreign matter is prevented from transporting between the airplane engine and said compressor drive and mounting apparatus housing.

10. The invention described in claim 9, further comprising a drain orifice drilled completely through said compressor drive and mounting apparatus housing at a point just on the engine side of said seal, whereby engine oil that leaks from the airplane engine to the engine power output gear is drained from said compressor drive and mounting apparatus housing.

11. An air conditioner refrigerant compressor drive apparatus for fixed-wing airplanes of the type having an engine power output gear and accessory pad, comprising:

a compressor drive apparatus housing;

attaching means for attaching said compressor drive apparatus housing to the accessory pad;

a compressor drive apparatus drive shaft extending linearly through said compressor drive apparatus housing;

a spline shaft for connecting said compressor drive apparatus drive shaft to the engine power output gear such that rotation of said compressor drive apparatus drive shaft occurs upon rotation of the engine power output gear, said spline shaft containing a splined-end which corresponds to the mating indentations on the engine power output gear and further containing a shear point consisting of an area of lesser relative shaft diameter, whereby said shear point fractures under a predetermined level of applied torque, thereby disconnecting the engine power output gear from said compressor drive apparatus drive shaft in the event the predetermined level of applied torque is exceeded;

bearing members located at opposite ends of said compressor drive apparatus drive shaft whereby said compressor drive apparatus drive shaft may freely rotate within said compressor drive apparatus housing;

a keeper plate removably connected to said compressor drive apparatus housing, whereby said bearing members are maintained in place within said compressor drive apparatus housing via said plate;

a compressor drive apparatus drive shaft pulley attached to the end of said compressor drive apparatus drive shaft not connected to said spline shaft;

a keystock fitting into corresponding keyway openings on said compressor drive apparatus drive shaft pulley and said compressor drive apparatus drive shaft, whereby said compressor drive apparatus drive shaft pulley is prevented from slipping on said compressor drive apparatus drive shaft;

belt drive means connecting said compressor drive apparatus drive shaft pulley with a compressor pulley attached to an air conditioner refrigerant compressor having a drive shaft for driving the compressor that is generally parallel with said compressor drive apparatus drive shaft whereby the compressor drive shaft rotates when said compressor drive apparatus drive shaft rotates.

* * * * *